United States Patent [19]

Hill et al.

[11] Patent Number: 5,082,177

[45] Date of Patent: Jan. 21, 1992

[54] FLUID INJECTION SPRAY SYSTEM

[76] Inventors: Daryl G. Hill, 12814 Rutherford Rd., Yakima, Wash. 98903; Roderick C. Robert, 6406 Scenic Dr.; Robert R. Sutphen, 441 Pleasant Valley Rd., both of Yakima, Wash. 98908

[21] Appl. No.: 472,560

[22] Filed: Jan. 31, 1990

[51] Int. Cl.⁵ ............................................ B05B 9/06
[52] U.S. Cl. ......................................... 239/77; 47/2
[58] Field of Search ............... 239/224, 227, 263.1, 239/263.3, 287, 77; 47/2

[56] References Cited

U.S. PATENT DOCUMENTS 3,067,541 12/1962 Smith .................................... 239/77
3,944,139 3/1976 Butler ................................... 239/77

Primary Examiner—Andres Kashnikow
Assistant Examiner—Lesley Morris
Attorney, Agent, or Firm—Fleit, Jacobson, Cohn, Price, Holman & Stern

[57] ABSTRACT

This invention is a fluid injection spray system for use with wind machine in order to protect orchard crops from heat or frost and to dispense agricultural chemicals. In one embodiment fluid is dispensed from nozzles on risers which are arrayed about the wind machine tower. The flow of fluid to the risers is sequentially controlled. In another embodiment, fluid is dispensed from nozzles mounted on conduits on a rotating gear box. Fluid is provided from the tower via a rotating valve.

8 Claims, 3 Drawing Sheets

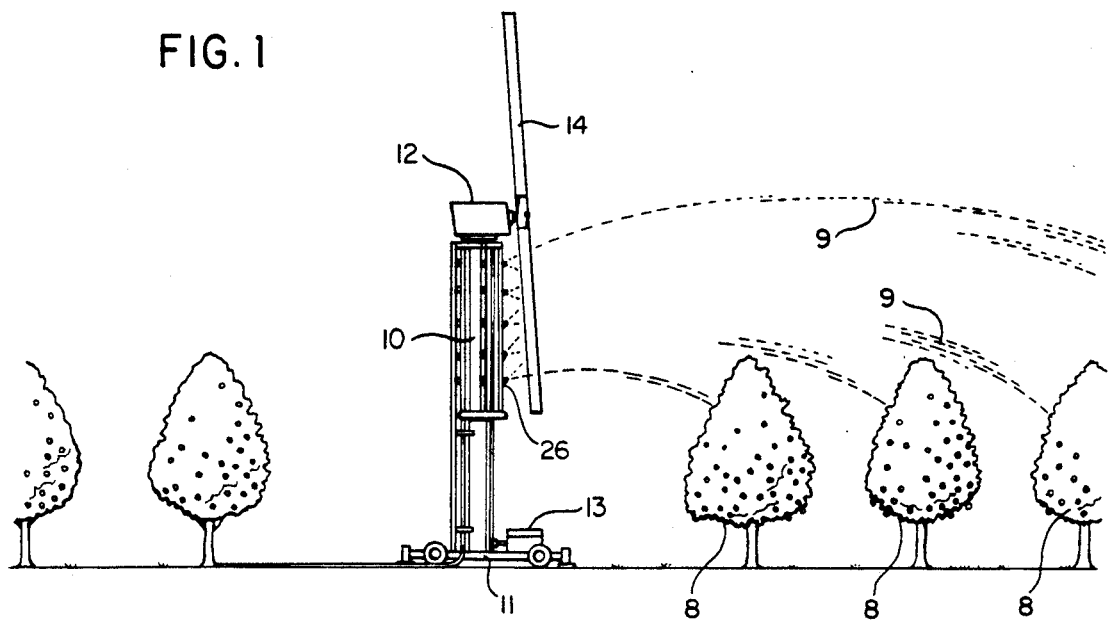
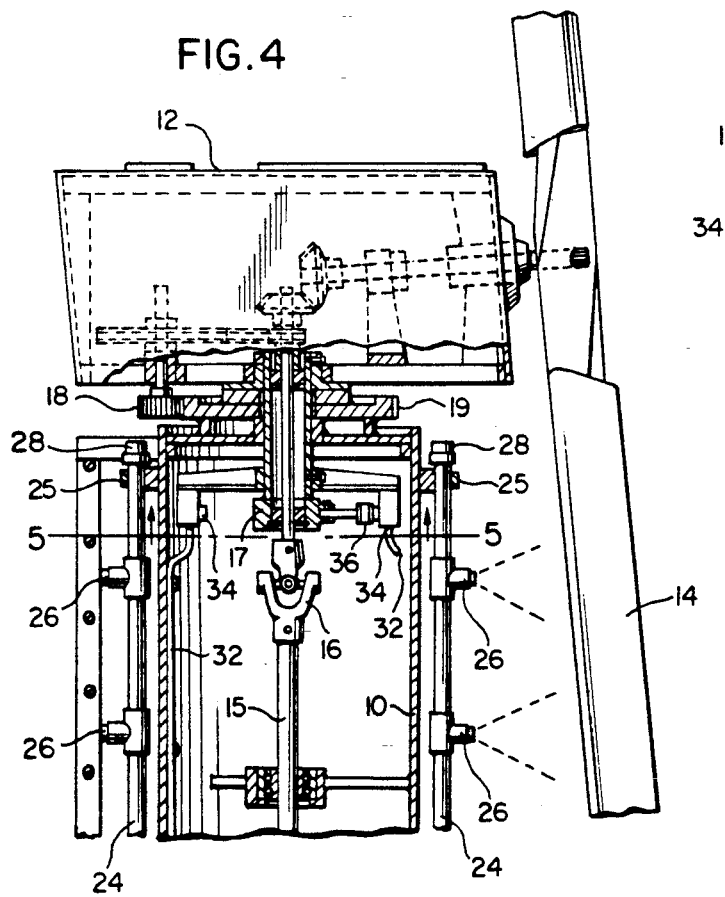

FLUID INJECTION SPRAY SYSTEM

BACKGROUND OF THE INVENTION

1. Field of the Invention

This invention relates to methods and devices for moderating the deleterious effects of weather on trees and plants and their fruit.

2. Description of Related Art

The present invention is a system of providing and distributing fluids into the wind stream of a wind machine for the purpose of reducing the temperature of a cultivated area, particularly areas with orchard crops. Conventional wind machines are used primarily to prevent frost damage to crops during the spring of the year. Their use when combined with the introduction of water into the wind stream will prevent hot weather damage to crops in the late summer and early fall.

U.S. Pat. No. 1,993,635 discloses an apparatus for preventing frosting and sunburning temperatures. In this invention water is dispersed through a hollow shaft and through the propellor hub. Water is carried up the tower in a stationary water pipe which is connected by a pipe fitting to the hollow shaft.

U.S. Pat. No. 2,238,120 discloses a spraying device in which spray nozzles on a manifold are attached to a circular fan guide. The spraying device is oscillated manually over a limited arc by means of a grasping lever.

U.S Pat. No. 3,067,541 discloses an apparatus in which water or other treatment fluid may be delivered through a duct to a discharge end where it is disbursed by a rotary blade mounted on a perpendicular axis. In another embodiment, fuel and treatment fluids are delivered from a line to an angular recess, a conduit, and into discharge orifices on the rotary blades.

U.S. Pat. No. 3,123,304 discloses an orchard treating system in which water is introduced into a vertical tubular housing through a standpipe, enters a central inlet opening, and is dispersed by a rotating diffusing disk.

U.S. Pat. No. 3,296,739 discloses a rotating orchard heater in which water or fuel is supplied through a pipe elbow and through a hollow stem to nozzles mounted on a circular screen along the circumference or in the center of the screen.

U.S. Pat. No. 3,944,139 discloses a wind machine with a nozzle-bearing circular manifold mounted just below a rotating gear housing. A cam attached to the housing sequentially activates valves on the nozzles as the gear housing rotates.

U.S. Pat. No. 4,643,355 discloses a fog generator in which spray nozzles are mounted on a grid which is held by a counterbalance in the air stream generated by an air mover.

Therefore, the prior art discloses methods and apparatus for injecting fluids into the wind stream from a wind machine. The prior art does not disclose the improvements of the present invention which increase the economy and reliability of such fluid injection.

SUMMARY OF THE INVENTION

The present invention is an improvement to wind machines commonly used to prevent frost damage to orchard crops. Such wind machines include a tower surmounted by a rotating gear box to which a propellor is mounted. Power is supplied by an engine or a motor located at the bottom of the tower and is transmitted via a drive shaft to the gear box and hence to the propellor. The gear box rotates in a complete 360° circle thus generating a wind stream which rotates in a complete circle about the tower.

The object of this invention is to provide a system for introducing fluids into the wind stream. Such fluids may be used to cool the orchard during the late summer and early fall, to aid in prevention of frost damage during the spring, or to distribute agricultural chemicals. This invention ensures that the fluid is introduced into the wind stream in the most efficient manner, thus ensuring economical use of fluids and minimizing any detrimental environmental effects of their use.

In one embodiment, fluid is introduced into the wind stream from nozzles mounted on vertical risers arrayed around the tower circumference. The flow of fluid to the vertical risers is controlled by a cam-switch assembly in order to assure that flow is limited to the riser or risers located at the optimum position with respect to the wind stream. The cam-switch assembly is enclosed in the tower and is activated by rotation of the gear box.

In another embodiment, fluid is fed to horizontal nozzle-bearing conduits mounted on the top of the rotating gear box. The conduits rotate with the gear box, thus assuring optimum delivery of fluid into the wind stream as the gear box rotates through a complete circle. Fluid is supplied to the horizontal conduit by a rotation valve. These two embodiments of this invention therefore provide efficient and reliable solutions to the problem of supplying fluid to a wind stream generated by propellor mounted on a rotating gear box.

It is an objective of this invention to prevent heat damage to orchard crops.

It is a further objective of this invention to achieve a 10°-12° F. temperature drop in orchards.

It is a further objective of this invention to improve the quality of apples by lowering apple temperatures from the high 90's° to the mid 80's° F.

It is a further objective of this invention to moisten orchard crops with a relatively fine mist which will prevent frost damage.

It is a further objective of this invention to provide foliar irrigation during hot weather which reduces stress on the crops.

It is a further objective of this invention to conserve fluids through the injection of fluids only into the optimal portion of the wind stream by sequentially activating fluid flow as the wind stream rotates or by providing a constant flow of fluid into a rotating wind stream.

It is a further objective of this invention to provide an enclosed cam-switch mechanism to sequentially activate fluid flow into a rotating wind stream.

It is a further objective of this invention to provide a rotational valve mechanism for delivery of fluid from a tower to a relatively rotating gear box.

It is a further objective of this invention to apply agricultural chemicals such as pesticides, fertilizers, and growth regulators to orchard crops.

It is a further objective of this invention to provide an apparatus which is reliable, inexpensive to manufacture, maintain and use, and whose operations is of minimal detrimental effect on the environment.

These and other objectives and advantages of the invention may be brought out in the following drawings, the detailed description, and the claims.

BRIEF DESCRIPTION OF THE DRAWINGS

FIG. 1 is a perspective view of the first embodiment of this invention attached to a wind machine showing it in operation in an orchard.

FIG. 4 is a fragmented side view partially in section of the first embodiment of this invention attached to a wind machine.

FIG. 5 is a bottom view of section 5—5 of FIG. 4.

DESCRIPTION OF THE PREFERRED EMBODIMENTS

First Embodiment

Figure 3:
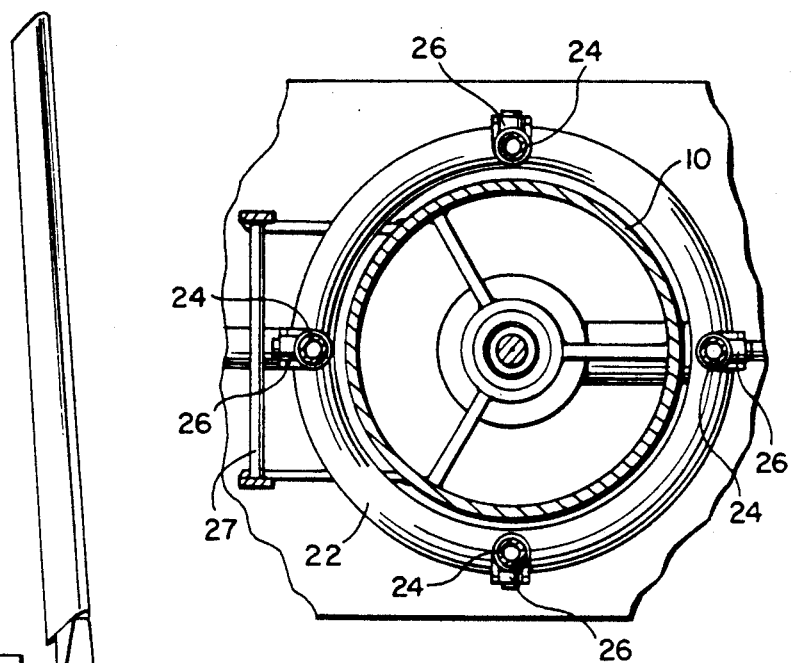
FIG. 3 is a top view of section 3—3 of FIG. 2.

FIG. 1 illustrates the use of a conventional wind machine with the first embodiment of this invention. It includes a conventional tower 10 supported by a base 11 which also supports a power source 13. At the top of the tower is a rotating gear box 12 to which is attached a propellor 14. The present invention is a system for injecting fluid into the air stream generated by the propellor. FIG. 1 depicts fluid 9 being dispersed from nozzles 26 into the wind stream from which it is dispersed onto the orchard crops 8.

The operation of a conventional wind machine is shown in FIG. 4. Rotary power to operate the wind machine is delivered from a power source 13 in FIG. 1, not shown in FIG. 4, by a drive shaft 15 through an universal joint 16 to a conventional gear train located in the gear box 12. The conventional gear train drives the propellor 14 and also rotates the pinion gear 18 which meshes with a fixed pinion gear 19 which is fixed to the top of the tower 10. Rotation of the drive shaft 15 therefore causes rotation of propellor 14 at a rate of 500 to 600 rpm and rotation of the gear box 12 in a 360° circle at a rate of 0.10 to 0.12 rpm. The wind stream generated by the propellor traverses a circle about the tower.

Figure 2:
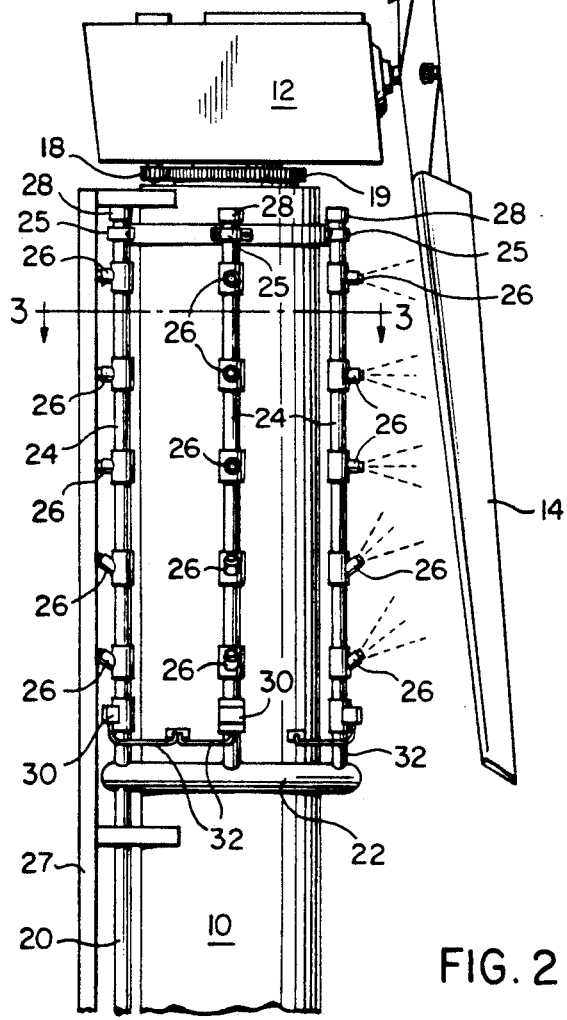
FIG. 2 is a fragmental side view of the first embodiment of this invention attached to the upper portion of a wind machine tower.

FIGS. 2 and 3 show the location of the first embodiment of the invention on the tower 10 of a conventional wind machine. Fluid is delivered through an inlet tube 20 to a circular riser manifold 22 which encircles the tower 10. Four tubular risers or pipes 24 having a first and a second end are attached by a first end to the riser manifold 22 and are attached near a second end to the tower 10 by riser supports 25. FIG. 3 illustrates the equidistant array of risers 24 about the circumference of the tower 10. Five nozzles 26 are located along the length of each riser. The nozzles spray water at a rate of 3 gallons per minute. The spray may be directed perpendicular to the tower axis or inclined towards the top or base of the tower. The risers are closed by caps 28 at the second end. The flow of liquid from the riser manifold 22 into a riser 24 is controlled by a normally closed electrical valve 30 located near the first end of a riser between the manifold 22 and first nozzle 26. Thus fluid is admitted to a riser only when the valve 30 is activated. A cam-switch mechanism located inside the tower 10 activates valve 30 only when the rotating gear box 12 is in the proper alignment.

FIGS. 4 and 5 show the cam-switch mechanism. Microswitches 34 are connected by wires 32 to the valves 30 in the risers 24. Electrical power is provided by a 12 volt battery which is part of the conventional wind machine. A shaft cover 17 attached to the gear box rotates along with the gear box. A cam 36 is fixedly attached to the shaft cover 17. As the gear box rotates, the cam 36 sequentially activates the micro-switches thus sequentially admitting fluid to the individual risers. The camswitch assembly is located inside the tower, which provides protection from the dust, dirt, water, and chemicals associated with agricultural operations. The sequential admission of fluid to the risers ensures that fluid is used only when the propellor is in position for most efficient incorporation of the fluid into the wind stream, thereby avoiding wastage of fluid.

Second Embodiment

Figure 6:
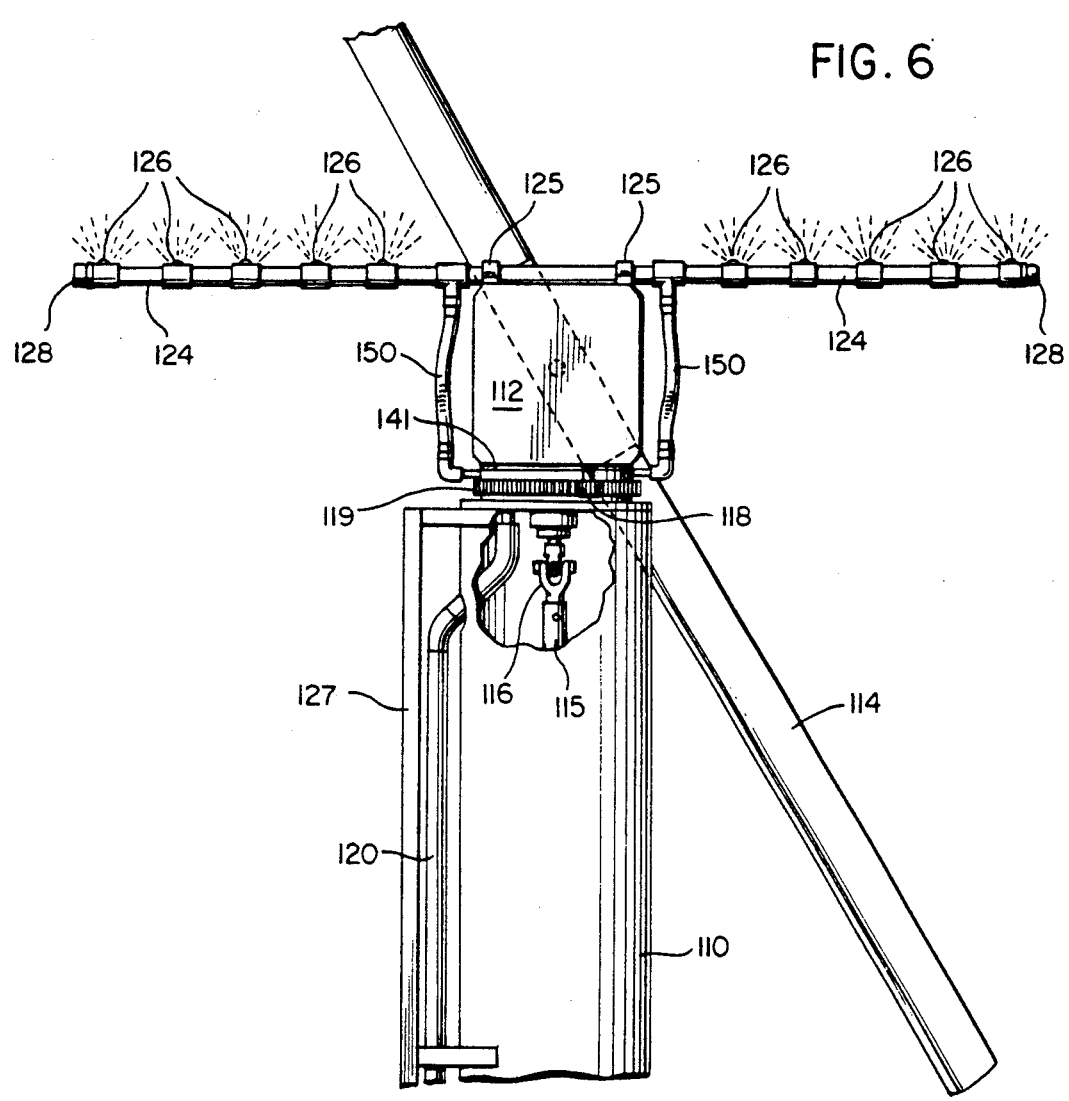
FIG. 6 is a fragmental side view partially in section of the second embodiment of this invention attached to the upper portion of a wind machine tower.

The second embodiment of this invention is illustrated in FIG. 6. A conventional wind machine with tower 110, a 360° rotating gear box number 112, and a propellor 114 is used with the second embodiment of this invention. Fluid is delivered through an inlet tube 120 to a rotation valve 141. The rotation valve rotates through a 360° range and enables the transfer of fluid from the stable tower to the rotating gear box. It will be described in more detail below. After leaving the rotation valve 141 fluid enters connecting tubes 150 which are connected to tubular conduits or pipes 124, which are attached by supports 125 to the top of the gear box 112. Each conduit has five nozzles 126 attached along its' length. Each conduit is closed on the outer end with a conduit cap 128. The nozzles 126 dispense fluid at 3 gallons per minute and may direct a spray perpendicular to the conduit or toward either end of the conduit.

Figure 7:
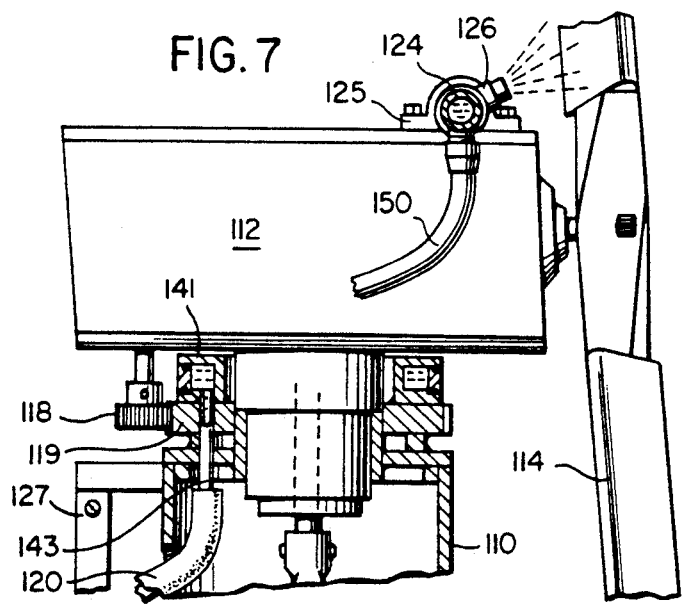
FIG. 7 is a side view partially in section of the second embodiment of this invention attached to the upper portion of a wind machine tower.
Figure 8:
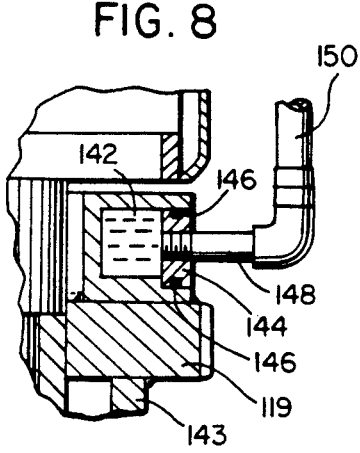
FIG. 8 is a side view in section of the rotation valve of the second embodiment of this invention.

The rotation valve 141 is shown in more detail in FIGS. 7 and 8. In a conventional wind machine pinion gear 119 is fixedly mounted to the top of the tower 110. This gear meshes with the rotating pinion gear 118 which drives the gear box in a 360° circle. The rotation valve 141 of the present invention comprises a circular U-shaped housing 142 which is fixedly attached to the top surface of the fixed pinion gear 119. The U-shaped housing is in the form of a cylindrical ring with two arms which form a three sided enclosure open on the side most distant from the center. Fluid is fed into the U-shaped housing 142 through a bridging tube 143 which is attached to the inlet tube 120. A rotating housing ring 144 fits into and closes the open side of the U-shaped housing 142 and slidingly rotates with respect to the fixed U-shaped housing. O-rings 146 at the top and bottom of the rotating housing ring 144 effect a sliding seal. Fluid leaves the rotation valve through two outlet tubes 148 located on opposite sides of the rotating housing ring 144. Connecting tubes 150 are connected at a first end to the outlet tubes 148 and are connected at a second end to conduits 124

In summary, fluid enters the rotation valve through the bridging tube 143, fills the fixedly mounted U-shaped housing 142, and exits through outlet tubes 148 attached to the rotating housing ring 144. Thus fluid is delivered from the relatively stable tower to the conduits fixed to a rotating gear box.

The embodiments of this invention may be constructed of any suitable materials which meets the requirement of strength, resilience, and resistance to corrosion, such as steel, brass or bronze, or plastics.

This invention has been used in the late summer and early fall to inject water into a wind stream to protect apples from damage caused by hot weather. A temperature drop of 10°-12° F. has been achieved and the apple temperatures were lowered from the high 90s° F. to the mid 80s° F.

In addition, the invention may be used to add moisture to the atmosphere surrounding crops to protect such crops from frosting during cold nights.

Another application is in the provision of water as foliar irrigation of crops.

Agricultural chemicals such as pesticides, fertilizers, and growth regulators may also be applied to crops using the invention.

The foregoing is considered as illustrative only of the principles of the invention. Further, since numerous modifications and changes will occur to those skilled in the art, it is not desired to limit the invention to the exact construction and operation shown and described, and accordingly all suitable modifications and equivalents may be resorted to, falling within the scope of the invention as claimed.

I claim:

1. An improvement in wind machines of the type in which a propellor which rotates in a substantially vertical plane is mounted on a rotating gear box located at the top of a tower wherein the improvement comprises:
   an inlet tube;
   a circular riser manifold connected to the inlet tube and encircling the tower;
   four tubular risers having a first and second end arrayed about the circumference of the tower with the axis of the risers substantially parallel to the axis of the tower;
   each riser connected by a first end to the circular riser manifold, and by a second end to the tower by a riser support;
   each riser having five nozzles arrayed along the length of the riser and directed outwardly;
   a normally closed electrically activated valve on each riser located between the riser manifold and the nozzles;
   four micro-switches each of which when activated opens one valve;
   an electrical power source;
   wires connecting valves, micro-switches, and power source;
   a cam which rotates in sequency with the gear box, the cam being located in the tower and arrayed in proximity to the micro-switches, so that rotation of the cam causes sequential activation of the switches; and
   a source of fluid.

2. An improvement in wind machines of the type in which a propellor which rotates in a substantially vertical plane is mounted on a rotating gear box located at the top of a tower, wherein the improvement comprises:
   an inlet tube;
   a rotation valve having a rotating housing ring mounted at the top of the tower and connected to the inlet tube;
   one or more conduits having a multiplicity of nozzles mounted on the rotating gear box;
   means for delivering fluid from the rotation valve to the conduits; and
   a source of fluid.

3. The improvement of claim 2 wherein the rotation valve comprises:
   means for introducing fluid to the valve;
   a circular U-shaped housing;
   a rotating inner housing ring;
   O-shaped seals; and
   means for removing fluid from the rotation valve.

4. The improvement of claim 3 wherein the means for removing fluid from the rotation valve is a connecting tube connected to the rotating valve at a first end and to a conduit at a second end.

5. An improvement in wind machines of the type in which a propellor which rotates in a substantially vertical plane is mounted on a rotating gear box located at the top of a tower wherein the improvement comprises:
   an inlet tube;
   a rotation valve comprised of:
      a circular U-shaped valve housing;
      a bridging tube connected to the circular U-shaped valve housing;
      a rotating inner housing ring aligned within the U-shaped valve housing;
      two opposed outlet tubes connected to the outer surface of the rotating inner housing ring; and
      two O-rings seals between the rotating inner housing ring and the circular U-shaped valve housing;
   the rotation valve fixedly mounted by the circular U-shaped valve housing to the tower;
   the inlet tube connected to the bridging tube;
   two connecting tubes having a first and a second end;
   the first ends of the connecting tubes connected to the outlet tubes of the rotation valve;
   two horizontal conduits fixedly mounted on the top of the rotating gear box;
   the second ends of the connecting tubes connected to the conduits;
      five nozzles arrayed along the length of each conduit;
   an end cap closing the end of each conduit; and
   a source of fluid.

6. An improvement in wind machines of the type in which a propeller which rotates in a substantially vertical plane is mounted on a rotating gear box located at the top of the tower wherein the improvement comprises:
   an inlet tube;
   a riser manifold connected to the inlet tube;
   a plurality of risers arrayed parallel to the axis of the tower and connected to the riser manifold;
   said risers extending from the riser manifold to the top of the tower;
   a plurality of nozzles on the risers; and
   a source of fluid.

7. The improvement of claim 6 further comprising means for selectively controlling the flow of water to the risers.

8. An improvement in wind machines of the type in which a propeller which rotates in a substantially vertical plane is mounted on a rotating gear box located at the top of the tower wherein the improvement comprises:
   an inlet tube;
   a riser manifold connected to the inlet tube;
   a plurality of risers arrayed parallel to the axis of the tower and connected to the riser manifold;
   a system of electrical valves controlled by micro-switches and activated by a rotating cam located within the tower for selectively controlling the flow of water to the risers;
   a plurality of nozzles on the risers; and
   a source of fluid.

* * * * *